Patented Mar. 24, 1936

2,035,286

UNITED STATES PATENT OFFICE 2,035,286

FERTILIZING MATERIALS

Edwin H. Wenzel, Fox Point, Wis.

No Drawing. Application December 17, 1932, Serial No. 647,835

4 Claims. (Cl. 71—9)

This invention relates to improvements in fertilizing materials and methods of manufacturing the same.

It is an object of this invention to provide a flocculent material manufactured from materials of a fibrous structure, such as wood, paper, cloth, corn stalks, sugar cane, etc., and combined with manure or other fertilizing materials, whereby to predetermine the strength of the fertilizer and to more evenly distribute it over the ground.

It is an object to produce a flocculent material by grinding it until it becomes a mass of minute fibres separated from each other and which may be freely mixed with powdered manure or like materials and serve, not only as a mulch for the ground, but also as a means for cutting the strength of the fertilizer to a point where it will not injure plant life adjacent to which it may be scattered.

It is a further object to provide such materials from waste products and which may be used as a fertilizer adapted as a mulch which will quickly disintegrate in the ground.

Another object is to provide fertilizing and mulching materials which may be manufactured for the purposes mentioned, or any other purpose, at a minimum cost, thus placing the product within the reach of those who cannot afford present expensive fertilizers.

When fibrous materials such as wood, paper, cloth, corn stalks, sugar cane, etc., are ground, the fibrous portions are disposed in all directions and form a mat-like structure with minute air spaces. Obviously, such materials provide a flocculent structure, which in texture, is porous and absorbent.

These materials may be used as a fertilizer for ground and for breaking hard dry ground when mixed therewith. The fact that the fibres are exceedingly small, exposes them to the action of earth moisture and consequently to rapid deterioration of the fibres, thereby resulting in rapid fertilization of the earth.

The material herein disclosed may be produced from waste material and placed upon the market at a cost far below that of similar materials now used. The results obtained by my product is, in many respects, superior to that obtained by similar materials.

The material herein disclosed, when used as a fertilizer is highly absorbent and thus retains moisture for a longer period of time and under normal conditions, longer than the natural ground or other fertilizing materials heretofore used. Thus when the fibrous materials are mixed with fertilizing chemicals, a very satisfactory base is provided for absorbing the fertilizing elements and holding them until drawn therefrom by plant life growing in the soil.

The fibrous material may also be used as bedding for animals and is well adapted for such use because of its ability to rapidly absorb large quantities of moisture. When the bedding is removed it may be placed, with the manure therein, in a dehydrating plant and, when dried, ground and thoroughly mixed. Of course, it will be understood that the manure, if not already in the material, may be dehydrated before it is mixed with the fibrous materials.

It becomes obvious, that I have provided a fertilizing combination which may be cheaply manufactured, which will modify the richness of the fertilizer to suit a predetermined condition, and which will freely absorb moisture and disintegrate, thereby passing quickly into intimate mixture with soil being fertilized.

Fertilizing materials composed of rich manures or other chemicals mixed with finely ground fibrous materials, such as those enumerated, may be used as packing for the roots of plants being shipped from place to place and may be left about the roots so packed when the plant is placed in the ground. This result is possible because the ground fibrous materials absorb some of the rich elements of the manure or fertilizers and retain them until the plant makes a demand for them. In other words, these rich elements are not deposited about roots of the plants where damage may be done by reason of this excessive richness.

Peat moss, which is of itself of little value as a fertilizing element, may be mixed with manures and chemicals in the manner previously outlined, and when so mixed becomes actually of value, because the peat absorbs some of the rich elements of the fertilizer, thus taking them away from plant roots until such time as the plant actually demands the elements.

It should be noted also that fertilizing elements generally have not a very great moisture absorbing power. When they are mixed with a ground mulch, such as that previously described, the mulch serves as a moisture reservoir for the fertilizer and keeps such moisture continually passing into or out of the mixture according to climatic conditions.

There are three methods of manufacturing fertilizer composed of fertilizing elements and ground fibrous materials. The preferred method is to first grind dry fibrous materials and then mix them with the manure so that the moisture in the manure will be drawn into the fibrous materials. If desired, this mixed manure and fibrous material may, after mixing, be thoroughly moistened so that the fertilizing elements in the manure will be more freely transferred to the fibrous materials. After the mixture has been thoroughly stirred to further facilitate the even distribution of the fertilizing elements, the mixture may then be dehydrated, to lighten it for shipment and also to make it easier to distribute over ground to be fertilized.

Another method of manufacturing the product herein disclosed is to first dehydrate both the manure and fibrous material and then grinding and mixing both elements in this dehydrated state.

Other steps may be added to this latter process, such as; after grinding and mixing, water may be added to cause the fertilizing elements in the manure to be transferred to a great extent to the fibrous materials and then the whole mixture again dehydrated.

There is another result accomplished by dehydrating the mixture, either before or after grinding and mixing, which result is in the fact that substantially all germ life is destroyed in the mixture and thereby avoiding undesirable plant growth where the fertilizer is used.

While I have indicated a preferred process, nevertheless, it will be understood that the fibrous materials may be mixed with the fertilizing elements before either are ground and dehydrated, and, after a period of time sufficient to permit the fertilizing material to be transferred to the fibrous materials, the whole may be ground and then dehydrated or dehydrated and then ground.

I claim:

1. The process of manufacturing fertilizing materials, said process comprising the dividing of fibrous materials into relatively smaller parts, the dehydrating of said divided materials, the mixing with said materials of animal excrement, the moistening of said mixture, and the subsequent dehydrating of said moistened mixture.

2. The process of manufacturing fertilizing materials, said process comprising the dividing of fibrous materials into relatively smaller parts, the dehydrating of said divided materials, the dividing of animal excrement into relatively small portions, and the mixing with said materials of said divided animal excrement, the moistening of said mixture, and the subsequent dehydrating of said moistened mixture.

3. The process of manufacturing fertilizing material, said process comprising the dividing of fibrous material and animal excrement separately into finely divided particles, dehydrating said material and excrement, mixing the dehydrated material and excrement, moistening the mixture, and then dehydrating the moistened mixture.

4. The process of manufacturing fertilizing material, said process comprising the mixing of finely divided substantially dry fibrous materials and animal excrement, the moistening of said mixture, and the subsequent dehydrating of said moistened mixture.

EDWIN H. WENZEL.